United States Patent [19]

Rodd et al.

[11] 4,120,217
[45] Oct. 17, 1978

[54] RIBBON CABLE SLITTER AND METHOD OF STRIPPING CABLE

[75] Inventors: Charles R. Rodd; Richard L. Scheuerman, both of Redwood Falls, Minn.

[73] Assignee: Magnetic Peripherals Inc., Minneapolis, Minn.

[21] Appl. No.: 858,932

[22] Filed: Dec. 9, 1977

[51] Int. Cl.² .............................................. H02G 1/12
[52] U.S. Cl. ...................................... 81/9.51; 30/90.6
[58] Field of Search ............. 29/427; 81/9.5 R, 9.5 B, 81/9.5 C, 9.51; 30/90.6; 83/622

[56] References Cited

U.S. PATENT DOCUMENTS

| 3,261,239 | 7/1966 | Moons et al. .......................... 81/9.51 |
| 3,774,478 | 11/1973 | Carpernter et al. .................. 81/9.51 |
| 3,914,864 | 10/1975 | Prince .................................... 30/90.6 |

Primary Examiner—Milton S. Mehr
Attorney, Agent, or Firm—Robert M. Angus

[57] ABSTRACT

A cable is stripped, according to this disclosure, by slitting the insulation along the length of a portion of the cable between the edge portions and the bounds of the conductors from the side closest the conductors to a depth at least as great as the ground plane; simultaneously slitting through the cable across the edge portions; and simultaneously slitting the insulation and plane between the edge portions from the side closest the ground plane. One of the tabs formed as a result of the aforementioned slittings is then pulled to peel away insulation and ground plane. Apparatus is employed to simultaneously accomplish the slittings.

19 Claims, 10 Drawing Figures

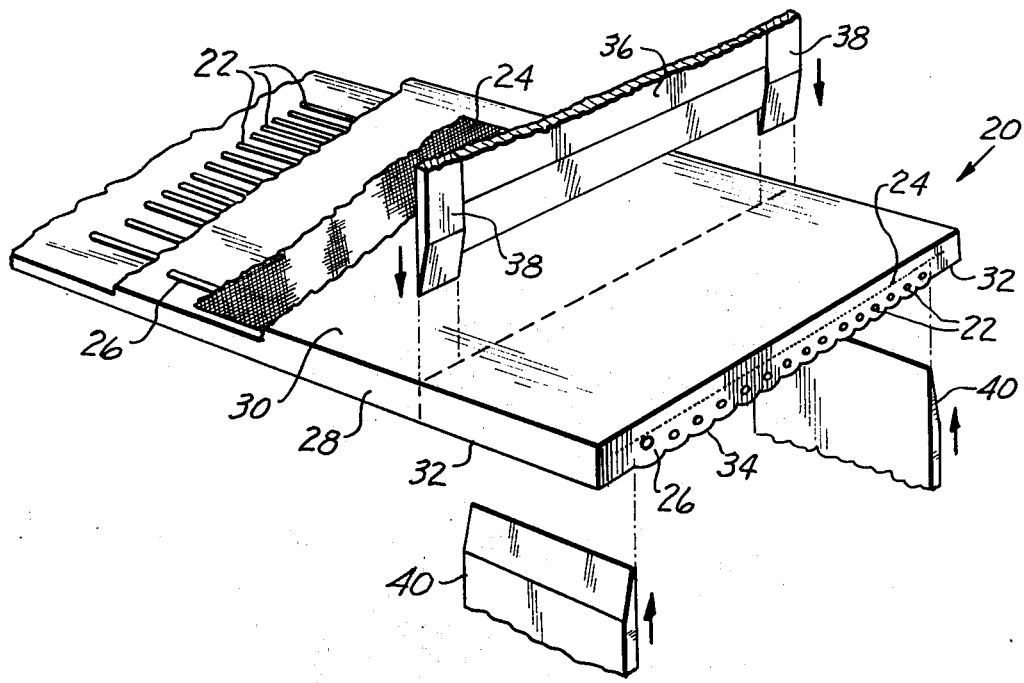
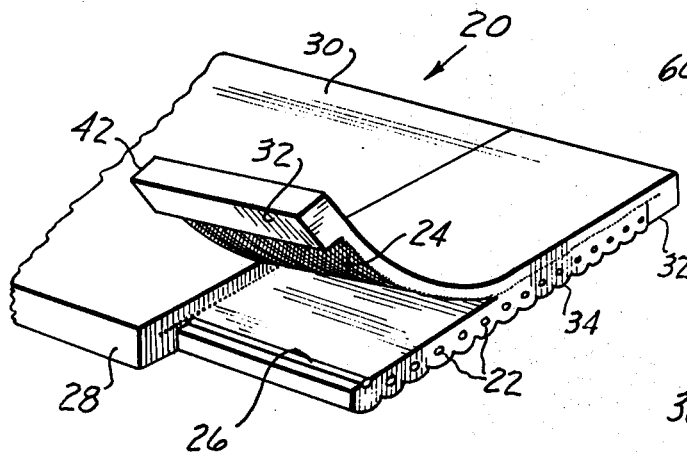
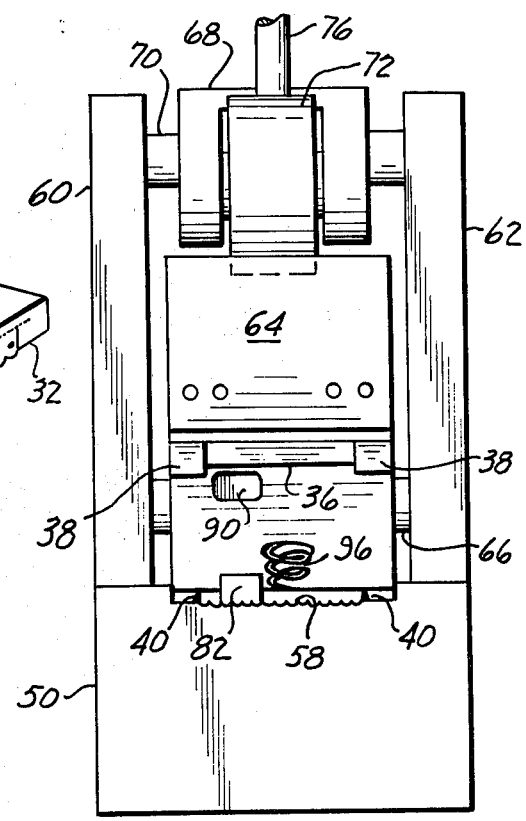

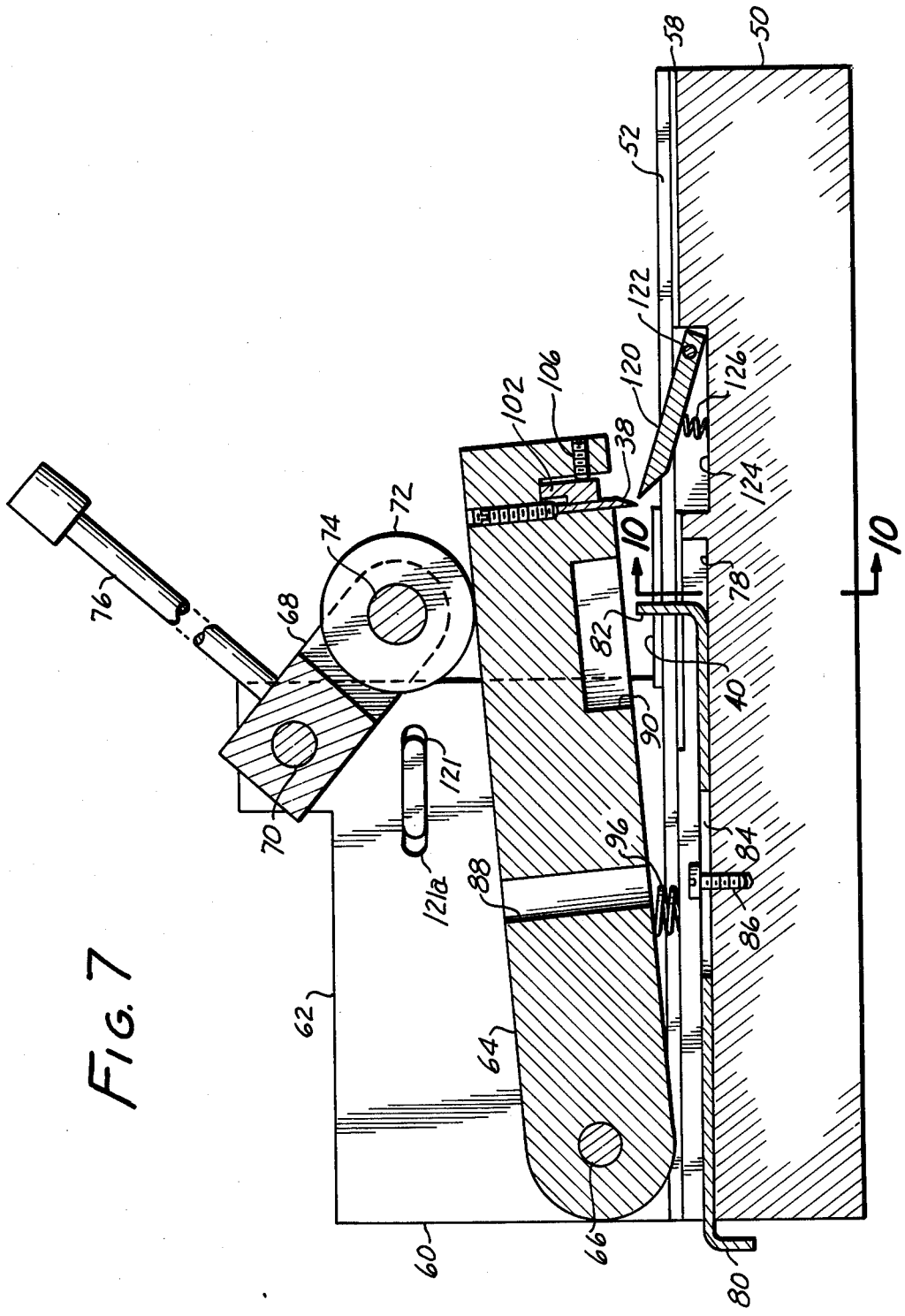

RIBBON CABLE SLITTER AND METHOD OF STRIPPING CABLE

This invention relates to ribbon cable slitters and particularly to apparatus for slitting multi-conductor flat ribbon cables. The apparatus is particularly useful in connection with the slitting of multi-conductor flat ribbon cables having ground planes to permit easy removal of insulation therefrom.

Ribbon cables are characterized by the inclusion of a plurality of electrical conductors arranged in coplanar relationship. The conductors are insulated from each other and from the surrounding environment by a suitable insulator material which forms the ribbon shape to the conductor cable. Many ribbon cables include a ground plane spaced from the plane of the conductors and also surrounded by the insulator material. Those cables with ground planes ordinarily include a ground wire contiguous the ground plane to permit connection of the ground plane to a conductor. The ground wire is ordinarily positioned between the ground plane and the plane of the conductors. For example, one such ribbon cable is available from 3M Company of St. Paul, Minnesota as SCOTCHFLEX Brand ground plane cables and includes a plurality of conductors in a first plane, a copper wire mesh ground plane in a second plane, and a wire contiguous the ground plane for establishing electrical connection thereto. The entire arrangement is imbedded in a polyvinyl chloride insulation body. A common use for ribbon cables resides in the interconnection of electrical components in electrical equipment as well as interconnection of electrical units. Ordinarily, suitable connectors terminate the ends of the cable for ready connection to electrical units.

To prepare a ribbon cable for termination by a connector, it has been necessary to trim away the insulation from the ground plane, remove the ground plane from the termination end to expose the ground wire, and trim the edges of the termination end to fit the connector. Thereafter, the individual conductors may be separated, stripped and trimmed for connection to the connector. Alternatively, the connector might pierce the insulation to make contact to the individual conductors.

One problem in the ribbon cable art has resided in the fact that the initial trimming of the cable conductor to trim and remove the ground plane and trim the edges of the termination end has required a substantial degree of precision manual workmanship by personnel assigned to that task. Cable strippers exist, but have not been altogether successful for this operation. For example, cable strippers available from Carpenter Manufacturing Company, Inc. of Manluis, N.Y., and allegedly described in U.S. Pat. No. 3,385,140, employ grinding wheels adjusted to grind away the insulation and ground plane from ribbon cables. Thereafter, the operator may trim the ends of the cable manually by using razor blades and the like. Another ribbon cable stripper is a SCOTCHFLEX Brand ribbon cable stripper available from 3M Company of St. Paul, Minnesota which, like the Carpenter cable stripper, employs a grinding wheel to grind away the insulation. Thereafter, the ground plane is removed manually through use of scissors or a knife, and the cable is manually trimmed in readiness for a connection to the connector.

In practice, the problems associated with the Carpenter and 3M cable strippers reside mainly in the fact that the cables must nevertheless be trimmed manually, at least subsequent to the removal of the top layer of insulation. Further, the use of grinding wheels to remove insulation and/or ground planes tends to leave rough or jagged edges to insulation at the termination end of the cable, thereby increasing the likelihood of failure of the insulation in the cable.

The present invention is concerned with a tool which slits the ribbon cable in such a manner as to permit ready removal of the insulation and ground plane from the termination end of the cable in readiness for subsequent application of a connector.

It is, therefore, an object of the present invention to provide apparatus for readying a ribbon cable for easy removal of insulation from the termination end thereof.

It is another object of the present invention to provide a simple tool capable of slitting the ribbon cable insulation and ground plane in a direction normal to the direction of the conductors and to slit the edges of the cable in a direction parallel to the direction of the conductors so that the excess insulation and ground plane may be removed from the cable.

It is another object of the present invention to provide a simple, yet effective, tool, significantly less expensive than prior cable strippers, to effectuate stripping of excess insulation and ground plane from a ribbon cable.

In accordance with the present invention, a cable slitter is provided having blades which, when properly adjusted, will slit the cable through the ground plane, leaving the insulation surrounding the conductors intact and which will slit through the ribbon cable at the edges thereof so that excess insulation and ground plane may be readily removed.

One feature of the present invention resides in the provision of a system of blades adjusted to slit the cable normal to the conductors to pierce the insulation and ground plane, to slit the cable through the insulation at the edges of the cable in a direction coplanar to the first-named slit, and to slit the insulation of the cable at the edge portions of the cable in a direction parallel to the conductors. The arrangement of the blade system is such as to form "tabs" at the edges of the cable so that the excess insulation and ground plane may then be peeled away from the cable, thereby leaving the trimmed cable with exposed ground wire and the plane of conductors ready for stripping, trimming and assemblage to a connector.

A feature of the present invention resides in the provision of first blade means for slitting the insulation along the length of a portion of the cable between the edge portions and the bounds of the conductors from the side of the cable closest to the conductor to a depth at least as great as the ground plane, second blade means for slitting through the cable across the edge portions, third blade means generally coplanar with the second blade means for slitting the insulation and ground plane between the edge portions from the side of the cable closest the ground plane to a depth at least as great as the ground plane, and operative means for simultaneously pressing the first, second and third blade means into the cable.

In accordance with the preferred embodiment of the present invention, the apparatus includes a base member supporting a receiving means for receiving a portion of the cable, such as the end of the cable to be stripped. First blade means is supported by the base member in a direction parallel to the receiving means and extending above the surface of the receiving means a distance sufficient to slit the edge portions of the cable from the side nearest the plane of the conductors to a depth approximately equal to the location of the ground plane. Cutter arm means is supported by the base member and movable between a rest position and actuated position. Second blade means is supported by said cutter arm means in a plane normal to the receiving means when the cutter arm means is in its actuated position. The second blade means is positioned above the region of the receiving means which receives the edge portions of the cable. Third blade means is supported by the cutter arm means in coplanar relation with the second blade means and above the region of the receiving means between the edge portions of the cable; the second and third blade means being relatively adjusted so that when the cutter arm means is in its actuated position, the second blade means will have slit through the cable and the third blade means will have slit the insulation and ground plane from the side of the cable nearest the ground plane. Actuator means is provided to move the cutter arm means between its rest and actuated positions.

Another feature of the present invention resides in the employing of the apparatus to strip cable by positioning a portion of the cable in the receiving means so that the side of the cable nearest the plane of conductors faces the first blade means and the side of the cable nearest the ground plane faces the second and third blade means. The actuator means is actuated to move the cutter arm means to its actuated position to slit the cable to form tabs at the edge portions thereof and to cut the insulation and ground plane between the edge portions on the side nearest the ground plane. One of the tabs is then pulled to pull away a portion of the insulation and ground plane.

Another feature of the present invention resides in the process of simultaneously slitting the cable (a) through the cable at the edge portions in a slit normal to the direction of the conductors, (b) through the insulation and ground plane between the edge portions from the side of the cable closest to the ground plane, and (c) through the insulation along the edge portions and parallel to the conductors from the side of the cable closest to the plane of conductors to a depth at least as deep as the ground plane. The recited slittings thus form tabs at the edge portions of the cable and excess insulation is peeled away by pulling one of the tabs.

The above and other features of this invention will be more fully understood from the following detailed description and the accompanied drawings, in which:

FIG. 1 is a perspective view of a typical ribbon cable illustrating the principles of operation of the slitting by the blade system employed in the apparatus according to the present invention;

FIG. 2 is a perspective view of a portion of a ribbon cable, as in FIG. 1, with a cable slit and ready for peeling away of excess insulation and ground plane;

FIG. 6 is an end view of the apparatus illustrated in FIGS. 3-5;

Figure 4:
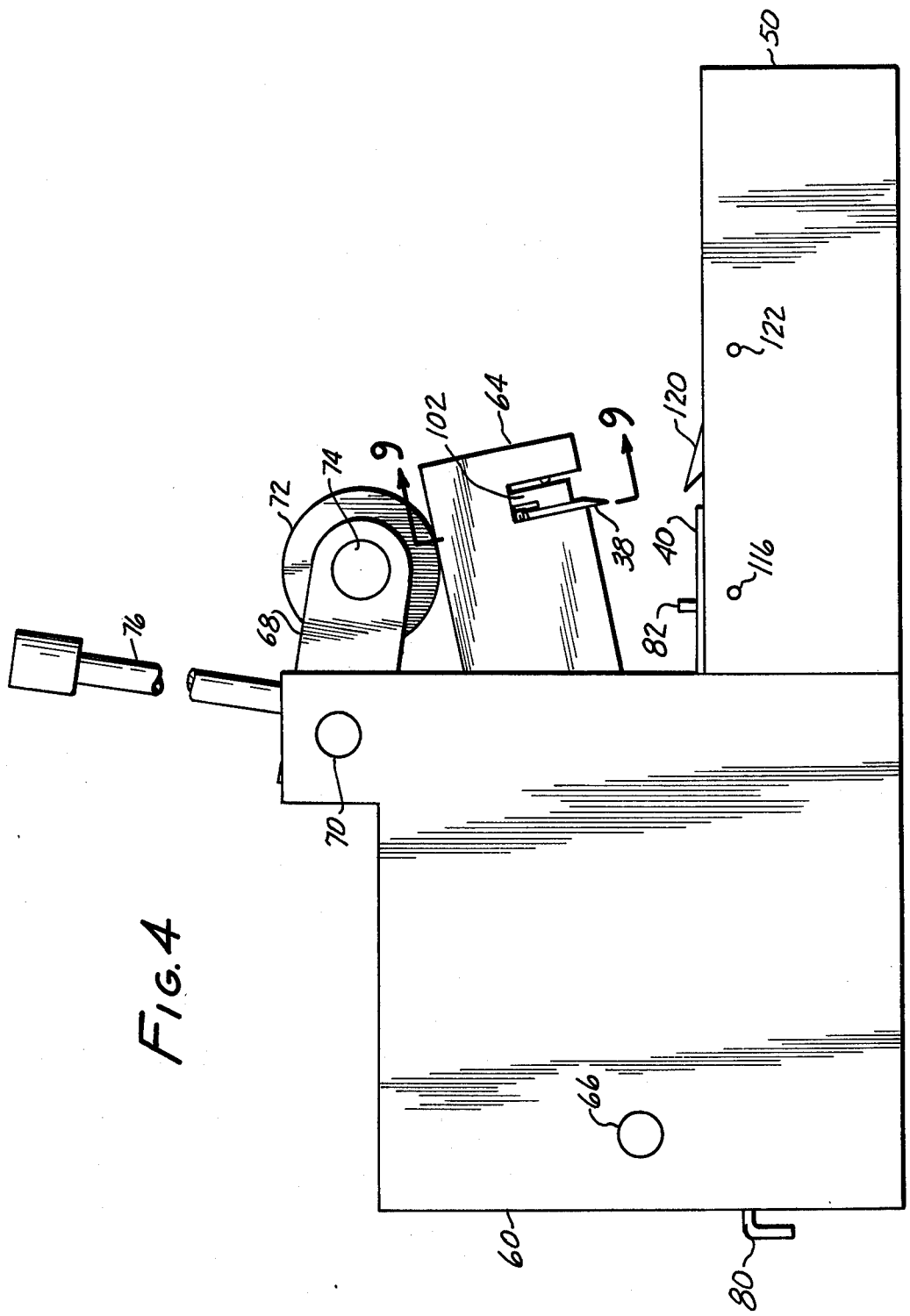
FIG. 4 is a side view of the apparatus illustrated in FIG. 3.
Figure 5:
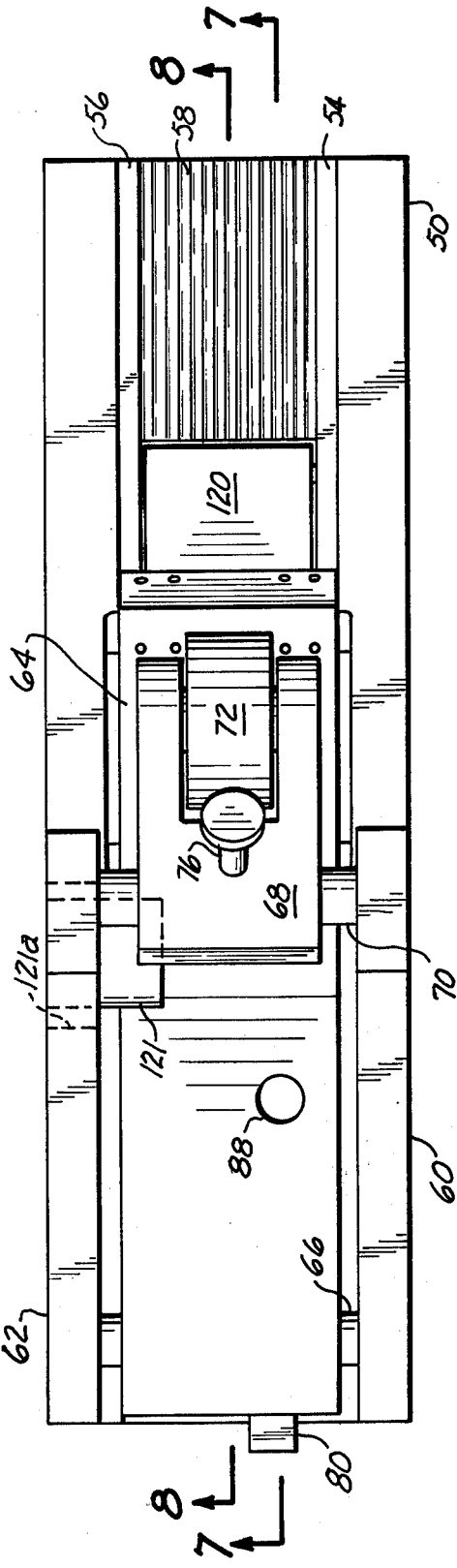
FIG. 5 is a top view of the apparatus illustrated in FIGS. 3 and 4.
Figure 9:
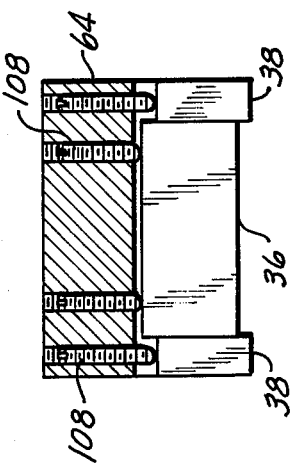
Figure 8:
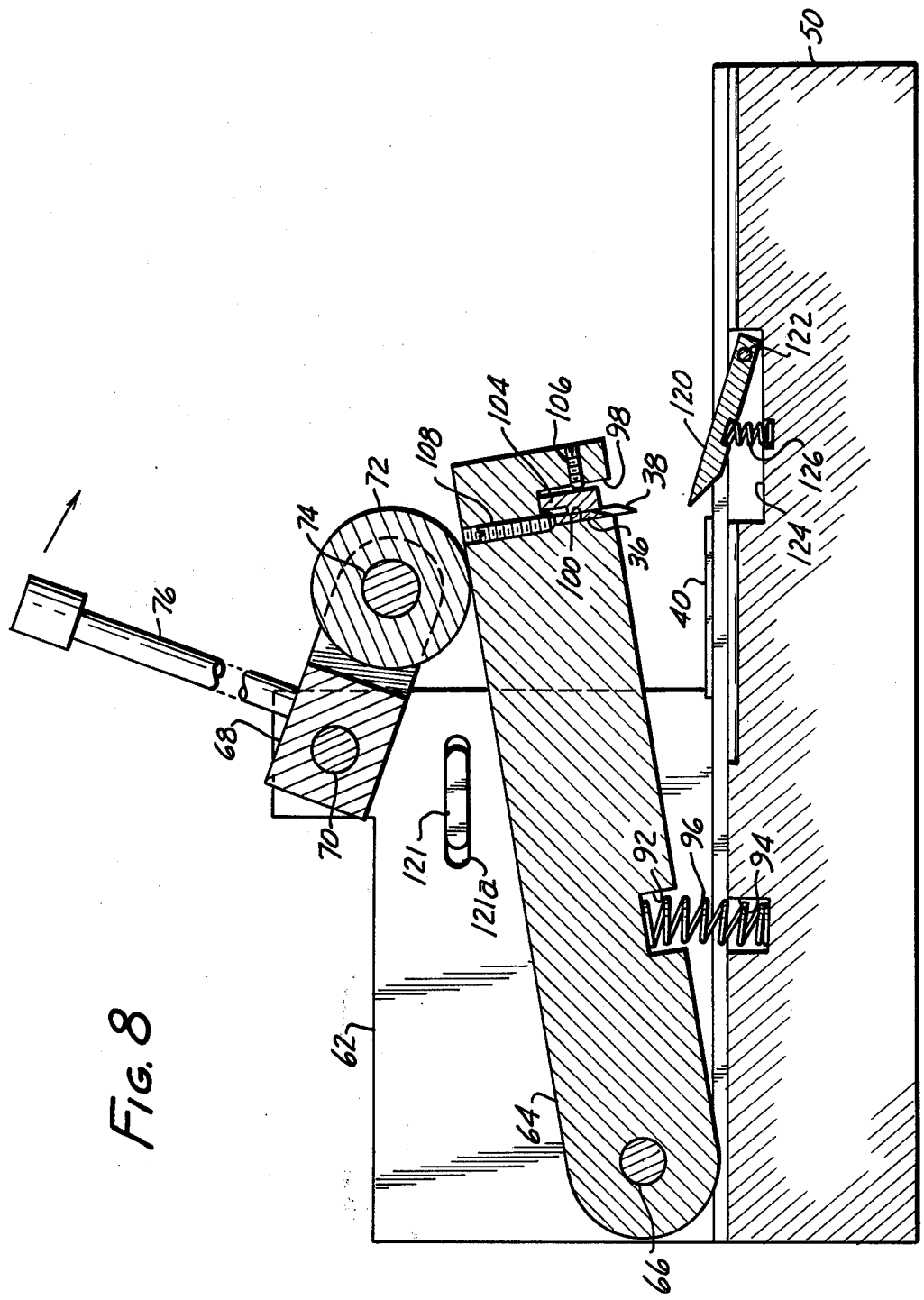

FIGS. 7 and 8 are section views taken at lines 7—7 and 8—8, respectively, in FIG. 5;

FIG. 9 is a section view taken at line 9—9 in FIG. 4; and

Figure 10:
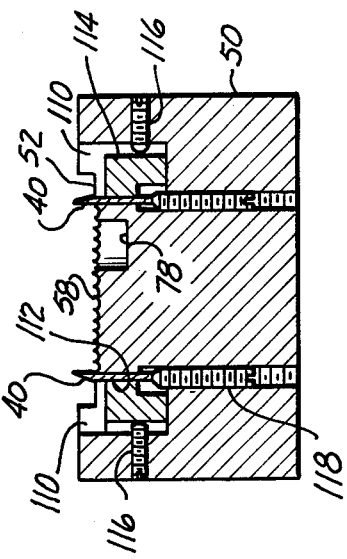

FIG. 10 is a section view taken at line 10—10 in FIG. 7.

Referring to the drawings, and particularly FIGS. 1 and 2, the principles of the present invention may be readily explained. In FIG. 1 there is illustrated a typical ribbon cable 20 having a plurality of conductors 22 disposed in coplanar relation. Separated from conductors 22 is a ground plane 24, which may be constructed of suitable copper wire mesh. Adjacent one side of ground plane 24 is a ground wire 26. The ground wire is contiguous ground plane 24 and separated from the plane of conductors 22. Conductors 22 and 26 and ground plane 24 are imbedded in a body of insulation 28, such as polyvinyl chloride. A ribbon cable such as cable 20 is commercially available from the 3M Company of St. Paul, Minnesota as its SCOTCHFLEX Brand ground plane cable. Ordinarily, one surface 30 of cable 20 is relatively flat, whereas the opposite surface of the cable includes flat edge portions 32 and raised rib portions 34 adjacent each conductor 22 and 26. The portions 34 extend the entire length of cable 20. For example, for a twenty-six conductor cable (twenty-five conductors 22 and one ground conductor 26), there will be twenty-six rib portions 34.

As shown in FIG. 1, the present invention employs a blade 36 having its cutting edge adjusted to pierce or slit insulation 28 in a direction normal to the direction of conductors 22 and from the side of surface 30 to pierce ground plane 24. A pair of second blades 38 pierce the insulation 28 and ground plane 24 at the edge portions of the cable to cut through the insulation. Blades 38 are positioned adjacent the ends of blade 36. A pair of third blades 40 are arranged to pierce insulation 28 in a direction parallel to conductors 22 from surfaces 32; blades 40 piercing the insulation up to at least ground plane 24. With the insulation and ground planes slit as described, and as shown in FIG. 2, the excess insulation and ground plane may be removed. In this respect, the portion of the insulation slit from the cable by blades 38 form a tab 42 which may be grasped and manually pulled to peel away excess insulation and ground plane. It will be noticed there is no need to slit the insulation along the plane of ground plane 24 inasmuch as the ground plane itself provides sufficient separation between the portions of the insulation to permit ready removal of the ground plane and insulation.

With reference to FIGS. 3-10, the apparatus in accordance with the presently preferred embodiment of the present invention may now be explained. The cable slitter in accordance with the present invention includes a base 50 having a channel 52 along the length thereof forming a flat surface 54, 56 and a plurality of recesses 58. The width of channel 52 is approximately equal to the width of cable 20 to be slit, with surfaces 54 and 56 corresponding to the flat surfaces 32 of the edge portions of the cable and recesses 58 corresponding to the rib portions 34 of the cable. Thus, for a 26-conductor cable, channel 52 will have 26 recesses 58. Side members 60 and 62 are fastened to base 50 by means of suitable fasteners (not shown), and cutter arm 64 is journaled between members 60 and 62 by means of a suitable shaft 66. Cam 68 is journaled between members 60 and 62 by shaft 70. Roller 72 is journaled to cam 68 by shaft 74. Actuator arm 76 is fixedly attached to cam 68.

Figure 3:
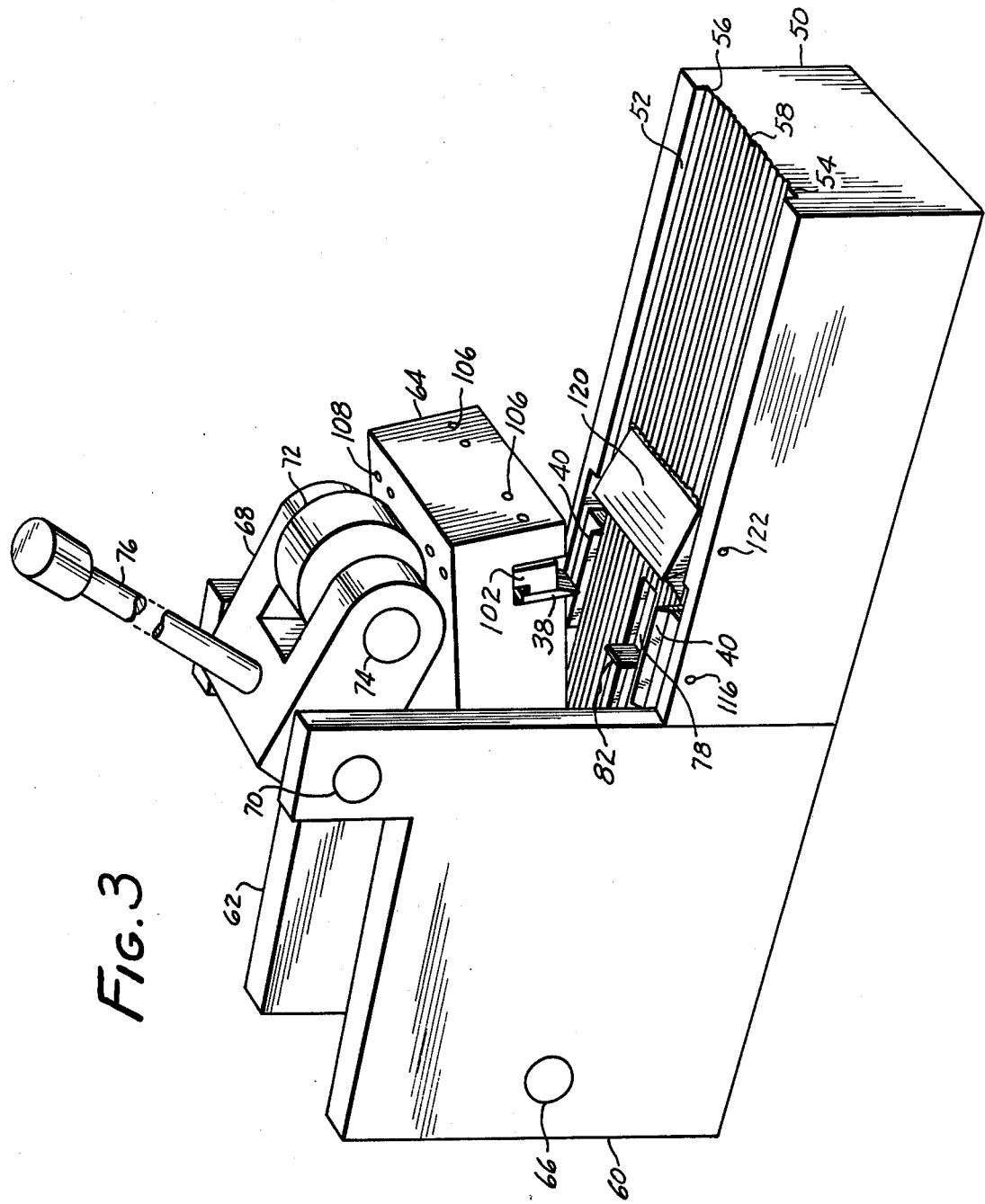
FIG. 3 is a perspective view of cable slitting apparatus in accordance with the presently preferred embodiment of the present invention.

As shown particularly in FIGS. 3 and 7, base 50 includes a recess 78 containing a suitable stop mechanism 80. Stop 80, which may, for example, be an extended arm, includes an upwardly extending portion 82 which serves as a stop or locator for the end of a cable to be stripped. Stop 82 includes a suitable opening 84 so that fastener 86 may be threadably assembled to base 50 to sandwich a portion of stop 80 between the lower surface of recess 78 and the head of fastener 86 to thereby fix the position of the stop. Passage 88 is provided through cutting arm 64 to permit access of a tool (not shown) to permit axial rotation of fastener 86 to thereby permit adjustment of stop 80. Also, recess 90 is provided in cutter arm 64 to receive portion 82 of stop 80 when the cutting arm is in its lower or actuated position. As shown particularly in FIG. 8, cutter arm 64 includes a recess 92, and base 50 includes a recess 94. Compression spring 96 is positioned within recesses 94 and 96 to bias cutter arm 64 to the rest position illustrated in the drawings.

With reference particularly to FIGS. 4, 7, 8 and 9, the details of the blade assembly attached to cutter arm 64 may be readily explained. Cutter arm 64 includes a recessed slot 98 extending across its entire width and normal to the direction of recesses 58 on base 50. A flat surface of blades 36 and 38 are positioned against surface 100 of slot 98, and positioning blocks 102 and 104 are positioned within slot 98 to bear against blades 38 and 36, respectively. In this respect, a pair of smaller positioning blades 102 are adapted to bear against each of blades 38 whereas a larger block 104 is adapted to bear against blade 36. Fasteners 106 are threadably assembled to cutter arm 64 to bear against the blocks 102 and 104 to wedge blades 36 and 38 against surface 100. Also, blocks 102 and 104 include suitable recesses to permit fasteners 108 to bear against the upper portions of blades 38 and 36 to position the blades in respect to the cutter arm to thereby fixedly position the cutting depth of blades 38 and 36.

As shown particularly in FIG. 10, base 50 includes a pair of recesses 110 so that blades 40 bear against surface 112 of recess 110. Suitable blocks 114 are positioned within the recesses 110, and fasteners 116 bear against the blocks 114 to wedge the blades in position. Fasteners 118 bear against the lower surface of blades 40 to fixedly position location of blades 40 in respect to the slot 52 to thereby adjust the cutting depth of blades 40.

As shown particularly in FIGS. 5, 7 and 8, cam stop 121 is positioned within slot 121a of side member 62 to provide a limit of movement of cam arm 68. Preferably, the lateral position of cam stop 121 is adjustable so the position of cam stop 121 may be fixed by means of suitable threaded fasteners (not shown).

As shown particularly in FIGS. 3, 4, 7 and 8, a lift finger 120 is pivotly mounted via shaft 122 to the sides of base 50 in slot 124. Compression spring 126 biases finger 120 to the position shown in the drawings. (For sake of clarity, finger 120 and slot 124 are not shown in FIGS. 5, 6, 9 and 10.) Preferably, the finger 120 is biased upwardly to a rest position at least as high as the uppermost edges of blades 40 with an inclined surface facing forwardly in the tool. Thus, cable to be slit, may be slid into the tool and is biased over blades 40 by the inclined surface of finger 120. When the tool is actuated, arm 64 will press against the cable to force finger 120 downwardly to permit slitting of the cable. Preferably, finger 120 extends across the ribbed section 58 of base 50.

As an alternative to finger 120, curved leaf springs (not shown) may be positioned ahead of blades 40 and fastened, for example by blocks 114 (FIG. 10). The curved section of such springs would serve to guide the cable over the blades 40 as described. However, the use of leaf springs is less desirable than finger 120 since the leaf springs would require adjustment upon replacement of blades 40 and could be damaged after excessive abuse. Thus, the lift finger 120 is considered more desirable from both an operational as well as manufacturing viewpoint.

In operation of the apparatus in accordance with the present invention, blades 36, 28 and 40 are first adjusted for their respective depths of slitting cable 20. While the position of these blades may be determined by suitable measurement, it may be more convenient to adjust the blades by using a test cable. In this respect, a test cable similar to cable 20 is positioned within channel 52 so that the rib portions 32 on the cable are received in respective recesses 58 in the base. The height of blades 40 are adjusted so that the blades will extend from the recess a distance sufficient slit the surface 32 of insulator 28 to a depth at least to the position of ground plane 24. Blades 40 may be adjusted to penetrate the cable slightly deeper, thereby slitting the ground plane, but the adjustment of blades 40 should not be permitted to slit entirely through the cable. Blades 38 are positioned within slot 98 in cutter arm 64 so as to provide an equal depth of penetration in relationship to the cutting arm, and blade 36 is positioned with respect to the position of blades 38 so that when the blades 38 just pierce through the thickness of cable 20, blade 36 will pierce the insulation and ground plane 24 but will not extend to the plane of conductor 22 or through ground wire 26. Thereafter, with the blades fixedly positioned with respect to each other, stop 121 is positioned with respect to cam 68 so that with the cutter arm in its lower or actuated position and actuator arm 76 rotated to a clockwise position (in respect of that shown in the drawings), blades 38 will just reach the surfaces 54 and 56 in a plane normal to the direction of the cable to pierce the full thickness of the cable when the rotational travel of cam 68 is limited by stop 121. Further, it is preferred that the distance by which blades 38 and 36 extend from the lower surface of cutter arm 64 should not greatly exceed desired cutting depths because it is desirable that the cutter arm press against the cable when the cutter arm is in its actuated position to be sure blades 36, 38 and 40 pierce or slit the cable. The position of stop 80 is adjusted to fix the position of the cable 20 in slot 52 to thereby determine the amount of insulation to be trimmed from the end of the cable. The apparatus is now ready for operation.

In operation, and with the apparatus in its rest position shown in the drawings, cable 20, which has been cleanly severed at one end, is positioned within slot 52 so that the flat surfaces 32 of the cable bear against the surfaces 54 and 56 of the base and the rib portions 34 of the cable are received in respective recesses 58 of the base. The cable is pushed forwardly into the tool and over finger 120 until the end of the cable bears against stop portion 82. Thus, finger 120 serves to guide the cable over the blades 40 while the cable is inserted into the tool. Actuator arm 76 is rotated clockwise (in respect to the drawings) thereby forcing cutter arm 64 downwardly to its actuated position so that the cutter arm presses against the cable and finger 120 to bias the finger downwardly so that blades 36, 38 and 40 slit or pierce the cable in the manner diagramed in FIG. 1. Thereafter, the excess insulation and ground plane may be peeled off as illustrated in FIG. 2 by pulling tab 42 to peel away the slit insulation and ground plane.

The present invention thus provides apparatus for slitting a ribbon cable which is effective in operation to permit stripping of excess insulation and ground plane from a ribbon cable as well as for trimming that cable for subsequent connection to a connector. The apparatus is effective in operation and is rugged in use. Cutting blades may be replaced and adjusted easily and the apparatus is adjustable to permit varying amounts of insulation to be stripped from a cable.

This invention is not to be limited by the embodiment shown in the drawings and described in the description, which is given by way of example and not of limitation, but only in accordance with the scope of the appended claims.

What is claimed:

1. Apparatus for slitting a ribbon cable, said cable being of the class having a body of insulation material forming first and second opposite sides and edge portions and having a plurality of elongated conductors disposed in a first plane within said body between said first and second sides and having a metallic ground plane disposed in a second plane within said body between said first plane and said second side, said edge portions being disposed between said first and second sides and outside the bounds of said conductors, said apparatus comprising: first blade means for slitting said insulation material along the length of a portion of said cable between said edge portions and the bounds of said conductors from said first side to a depth approximately equal to the distance to said ground plane; second blade means for slitting through said cable across said edge portions; third blade means generally coplanar with said second blade means for slitting said insulation and ground plane between said edge portions from said second side to a depth at least as great as the distance to said ground plane; and operative means for simultaneously pressing said first, second and third blade means into said cable.

2. Apparatus according to claim 1 wherein said apparatus includes a base member; receiving means supported by said base member for receiving said portion of said cable, said receiving means including surface means for supporting said first side of said cable; said operative means including cutter arm means supported by said base member and moveable between a rest position and an actuated position, and actuator means for moving said cutter arm means from its rest position to its actuated position; said first blade means being supported by said base member to extend upwardly from said surface means of said receiving means a distance at least as great as the distance between said ground plane and said first side of said cable; said second and third blade means being supported by said cutter arm means above said receiving means, said second blade means extending downwardly from said cutter arm means a distance at least as great as the distance between said first and second sides of said cable, and said third blade means extending downwardly from said cutter arm means a distance at least as great as the distance between said second side and said ground plane of said cable.

3. Apparatus according to claim 2 wherein said cable further includes a ground conductor contiguous said ground plane and between said ground plane and said first plane, said third blade means being positioned to slit said insulation and ground plane from the second side of said cable to a depth sufficient to slit said ground plane but not to slit said ground wire.

4. Apparatus according to claim 2 wherein said first blade means comprises first and second blades fixedly attached to said base member and said second blade means comprises third and fourth blades fixedly attached to said cutter arm means, said third and fourth blades being attached to said cutter arm means in a plane substantially normal to the planes containing said first and second blades when said cutter arm means is in its actuated position, said third blade means comprising a fifth blade fixedly attached to said cutter arm means between said third and fourth blades.

5. Apparatus according to claim 4 wherein said cutter arm means is pivotly mounted to said base member, bias means for biasing said cutter arm means to its rest position, said actuator means including cam means for pivotly moving said cutter arm means from its rest position to its actuated position.

6. Apparatus according to claim 5 further including cable stop means supported by said base member for positioning an end of said cable portion in said receiving means.

7. Apparatus according to claim 6 wherein said first side of said cable includes a ribbed surface and said surface means of said receiving means includes recesses to receive said ribbed surface.

8. Apparatus according to claim 5 wherein said first side of said cable includes a ribbed surface and said surface means of said receiving means includes recesses to receive said ribbed surface.

9. Apparatus according to claim 2 wherein said cutter arm is pivotly mounted to said base member, bias means for biasing said cutter arm means to its rest position, said actuator means including cam means for pivotly moving said cutter arm means from its rest position to its actuated position.

10. Apparatus according to claim 9 further including cable stop means supported by said base member for positioning an end of said cable portion in said receiving means.

11. Apparatus according to claim 9 wherein said first side of said cable includes a ribbed surface and said surface means of said receiving means includes recesses to receive said ribbed surface.

12. Apparatus according to claim 2 further including cable stop means supported by said base member for positioning an end of said cable portion in said receiving means.

13. Apparatus according to claim 2 wherein said first side of said cable includes a ribbed surface and said surface means of said receiving means includes recesses to receive said ribbed surface.

14. Apparatus according to claim 2 further including lift means supported by said base member for biasing said cable over said first blade means, whereby said cable may be slid into said receiving means and over said first blade means, said lift means being movable upon movement of said cutter arm to its actuated position to permit said cutter arm to press said cable against said surface means of said receiving means.

15. Apparatus according to claim 14 wherein said lift means comprises a lift finter having an inclined surface, and bias means for biasing the uppermost portion of said inclined surface above the uppermost portion of said first blade means.

16. The method of stripping excess insulation from a ribbon cable of the class having a body of insulation material forming first and second opposite sides, a plurality of elongated parallel conductors disposed a first plane within said body and a metallic ground plane disposed in a second plane within said body, said first plane being separated from said second plane and being between said first side and said second plane and said second plane being between said second side and said first plane, said body extending beyond said conductors in said first plane to form edge portions of said cable to be stripped away, said method comprising the steps of:

(a) slitting through said insulation material and ground plane at the edge portions of said cable in a direction normal to said conductors;

(b) simultaneously slitting said insulation material and ground plane between said edge portions in a direction coincident with the direction of the first-named slitting step from said second side to a depth at least as great as the depth of said second plane but not as great as the depth of said first plane;

(c) simultaneously slitting said insulation material in a direction normal to said first and second-named slitting steps from said first side to a depth at least as great as the depth of said second plane but not through said body, said last-named slitting occurring between said conductors and said edge portions and parallel to said conductors whereby said edge portions form tabs; and (d) subsequent to steps (a), (b) and (c), peeling away excess insulation by pulling one of said tabs.

17. The method according to claim 16 wherein step (d) includes peeling away excess ground plane.

18. The method according to claim 6 wherein said ribbon cable further includes a ground conductor contiguous said ground plane and between said first and second planes, said ground conductor being spaced from said first plane, and wherein the depth of slitting set forth in step (b) is not so great as to slit said ground conductor.

19. The method according to claim 18 wherein step (d) includes peeling away excess ground plane.

* * * * *

UNITED STATES PATENT AND TRADEMARK OFFICE
CERTIFICATE OF CORRECTION

PATENT NO. : 4,120,217
DATED : October 17, 1978
INVENTOR(S) : Charles R. Rodd et al.

It is certified that error appears in the above—identified patent and that said Letters Patent is hereby corrected as shown below:

Column 8, line 63, "finter" should read -- finger --.

Column 10, line 11, "6" should read -- 16 --.

Signed and Sealed this

Twenty-ninth Day of April 1980

[SEAL]

Attest:

SIDNEY A. DIAMOND

Attesting Officer

Commissioner of Patents and Trademarks